United States Patent [19]

Shibasaki et al.

[11] Patent Number: 4,648,706
[45] Date of Patent: Mar. 10, 1987

[54] IMAGE REPRODUCTION APPARATUS

[75] Inventors: Sohei Shibasaki; Yasumasa Iwasaki; Noriki Ono; Koichi Arai; Koji Maruyama; Tatsumi Shimanari, all of Higashiyamatoshi, Japan

[73] Assignees: Casio Computer Company, Ltd.; Casio Electronics Manufacturing Company, Ltd., both of Tokyo, Japan

[21] Appl. No.: 787,379

[22] Filed: Oct. 15, 1985

[30] Foreign Application Priority Data

| Oct. 17, 1984 | [JP] | Japan | 59-216381 |
| Oct. 22, 1984 | [JP] | Japan | 59-158429[U] |
| Oct. 29, 1984 | [JP] | Japan | 59-163497[U] |
| Dec. 25, 1984 | [JP] | Japan | 59-271696 |
| Apr. 23, 1985 | [JP] | Japan | 60-61449[U] |
| Apr. 26, 1985 | [JP] | Japan | 60-63959[U] |

[51] Int. Cl.$^4$ .................. G03B 27/52; G03B 27/70
[52] U.S. Cl. ........................... 355/43; 355/3 R
[58] Field of Search ............... 355/5, 43, 51, 60, 46, 355/3 R, 39; 354/106, 109

[56] References Cited

U.S. PATENT DOCUMENTS

| 3,473,451 | 10/1969 | Greenly et al. | 355/43 X |
| 3,480,360 | 11/1969 | Mallory et al. | 355/43 X |
| 4,194,833 | 3/1980 | Lester et al. | 354/5 X |
| 4,367,033 | 1/1983 | Watanabe | 355/5 |
| 4,541,706 | 9/1985 | Kishi | 355/5 X |

FOREIGN PATENT DOCUMENTS

| 55-27889 | 7/1980 | Japan . |
| 56-40341 | 9/1981 | Japan . |
| 56-40342 | 9/1981 | Japan . |
| 57-158858 | 9/1982 | Japan . |
| 59-171695 | 9/1984 | Japan . |
| 59-212070 | 11/1984 | Japan . |
| 59-212866 | 12/1984 | Japan . |

Primary Examiner—Richard A. Wintercorn
Attorney, Agent, or Firm—Sandler & Greenblum

[57] ABSTRACT

The image reproduction apparatus of the present invention can make a copy of images written or drawn on a board as well as a copy of images of an original provided on an original table. The image reproduction apparatus comprises a board portion and a copying portion. The optical information of images written or drawn on a board is supplied to the copying section through an optical system. The copying section moves between a position where the image reproduction is performed by the above optical information and a position where an ordinary copying of the original is performed. Thus, according to the present invention, the copying section moves between said two positions.

15 Claims, 30 Drawing Figures

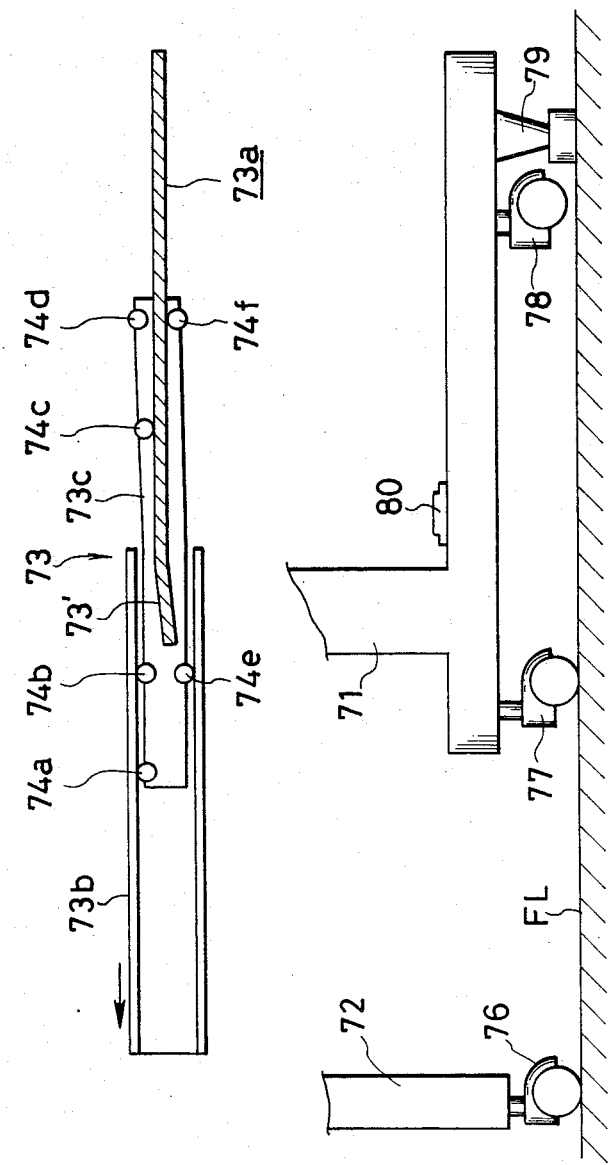

IMAGE REPRODUCTION APPARATUS

BACKGROUND OF THE INVENTION (a) Field of the Invention

The present invention relates to an image reproduction apparatus for use in the electrophotographic copying machine and the like, and more particularly, it relates to an image reproduction apparatus for reproducing images such as letters and figures written on a board (wherein letters and the like are written for display on a plane made of a resin, which enables white color to be easily erased, by means of a felt pen and this is called writing board and white board but it will be hereinafter referred to as board).

(b) Prior Art

Letters, figures and the like written on the blackboard in meetings and lectures were conventionally transcribed into a notebook. For the purpose of avoiding troublesome handwork and preventing clerical errors at the transcription however, some image reproduction apparatus have been proposed to directly copy the letters and the like written on the blackboard.

In the case of one of these image reproduction apparatus for example, the board on which letters and the like have been written is arranged so as to be movable into and out of a dark box; light is irradiated onto the board which has entered inside the dark box; light reflected from the board is introduced onto the surface of a photosensitive body through an optical system such as lens and mirror and the images such as the letters on the board are reproduced onto the photosensitive body according to the well-known electrophotographic process; the images thus reproduced on the photosensitive body are copied onto a sheet of paper.

In the case of this image reproduction apparatus, however, the board must be arranged so as to be movable into and out of the apparatus. When the board has an area large enough to serve as the blackboard, therefore, the whole of the apparatus must be made large. When the whole of the apparatus is made small to the contrary, the board must be small so it cannot sufficiently serve as the blackboard.

In addition, the above arrangement enables only the image written on the board to be copies but makes it impossible to copy images from the originals.

SUMMARY OF THE INVENTION

The present invention is intended to eliminate the above-mentioned drawbacks and the object of the present invention is therefore to provide an image reproduction apparatus capable of easily reproducing letters, figures and the like written on a board as well as functioning as the usual copying machine, wherein a transferring section can be released from a display section and wherein the transferring section can be reliably moved to a predetermined position to reproduce excellent images.

For the purpose of achieving the object of the present invention, the present invention is characterized in that the transferring section is reliably moved to a first position, where the transferring section is engaged with the display section by means of a carrier means to reproduce an image, which has been written on the display section, on a sheet of paper and that the transferring section is reliably moved to a second position where the transferring is released from the display section, to copy images which have been formed on the sheets of originals stuck on a table in the transferring section on the sheets of papers.

BRIEF DESCRIPTION OF THE DRAWING

FIGS. 17 through 24 are intended to explain another embodiment of the mechanism for moving or carrying the copying section, wherein FIG. 17 is a perspective view showing the copying section pulled out to its original copying position; FIG. 18 is a perspective view showing the copying section housed in to its board-sheet-image copying position; FIG. 19 is a rear perspective view showing the main portion of the arrangement shown in FIG. 18; FIG. 20 is a rear perspective view showing the main portion of the arrangement shown in FIG. 17; FIG. 21 is a rear perspective view showing a part of the middle portion of a rail; and FIGS. 22-24 are a side view to explain the movement of casters which belong to the guide rail and auxiliary members.

DETAILED DESCRIPTION OF THE INVENTION

Figure 1:
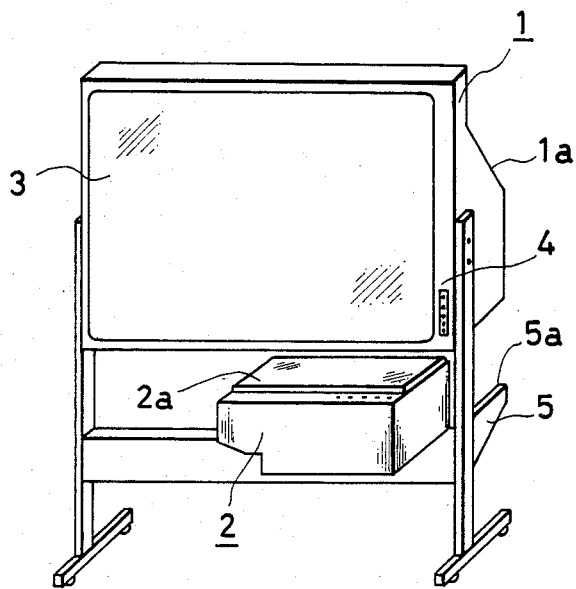
FIG. 1 is a perspective view showing an embodiment of the image reproduction apparatus according to the present invention.

Embodiments of the present invention will be described in detail referring to the drawings.

Figure 2:
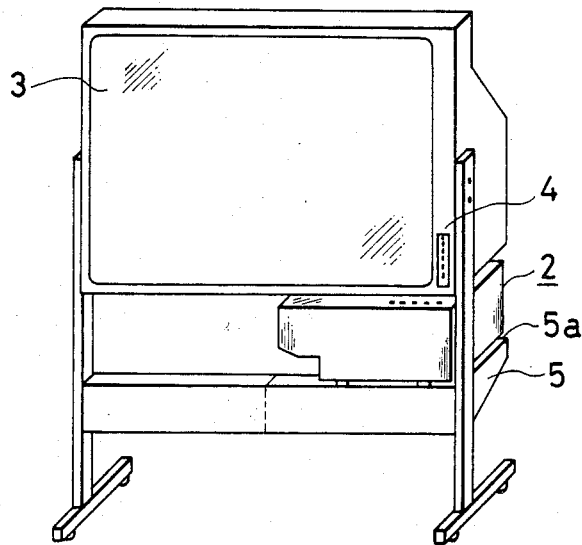
FIG. 2 is also a perspective view showing the image reproduction apparatus according to the present invention.

FIG. 1 is a perspective view showing the whole arrangement of an image reproduction apparatus according to the present invention and FIG. 2 is a perspective view showing the image reproduction apparatus of the present invention when it is under the state of copying the board.

In these Figures, the image reproduction apparatus comprises a board section 1 and a copying section 2. The board section 1 includes a frame 1a, a sheet of board 3 and a board operating section 4, and it houses a board optical system and a means for winding the board sheet 3. The copying section includes a table provided with an original cover 2a, and it is arranged movable forward and backward on rails 5a mounted on a copying section support 5.

When an original is placed under the original cover 2a and copied, the copying section 2 is pulled forward, as shown in FIG. 1, to carry out original copying, and when an image written on the board sheet 3 is to be copied, it is pushed in backward, as shown in FIG. 2.

Figure 3:
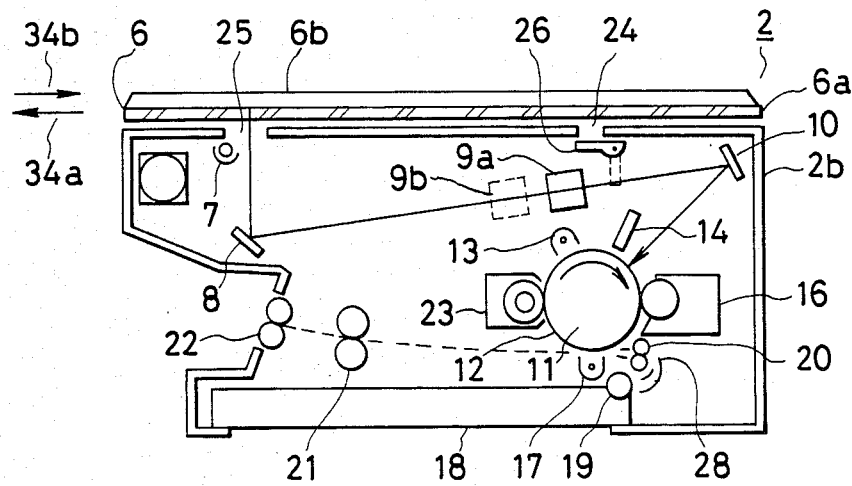
FIG. 3 shows a side view of an arrangement of the transferring section which is under the condition in the process state of copying an original.

FIG. 3 shows an arrangement of the inside of the copying section 2. A table 6 includes a sheet of glass 6a for an original, a cover 6b for an original and the like, and when an original (not shown) placed on the glass plate 6a is to be copied, light from a light source 7 is irradiated onto the original and light reflected from the original is introduced onto a photosensitive face 12 of a photosensitive body 11 through a first copying mirror 8, a copying lens 9a and a second copying mirror 10. Since the photosensitive face 12 has been uniformly charged by a charger 13 and the charge has been erased from the nonimage area on the photosensitive face 12 by a blank lamp 14, an electrostatic latent image is formed on the photosensitive face 12 when it is exposed by the light reflected. The electrostatic latent image thus formed on the photosensitive face 12 is made visible as a toner image by a developing means 16, and this toner image is transferred onto a sheet of paper by means of a transferring means 17, said paper being fed from a paper supply cassette 18 through a paper supply roller 19 and timing rollers 20, synchronizing with the foremost end of the toner image in a manner which will be described later. The toner image thus transferred onto the paper is heat-fixed by a fixing means 21 and the paper is then discharged outside by paper discharging rollers 22.

Toner which has not been completely transferred by the transferring means 17, remaining on the photosensitive face 12, is removed by a cleaner 23, and the photosensitive face 12 is uniformly charged again by the charger 13 to become ready for the next exposure.

An exposure opening 24 for copying the board and an exposure opening 25 for copying the original are provided in the ceiling of a case 2b under the original table 6, and a shutter 26 for preventing light outside from entering into the case 2b is arranged under the exposure opening 24.

Figure 4:
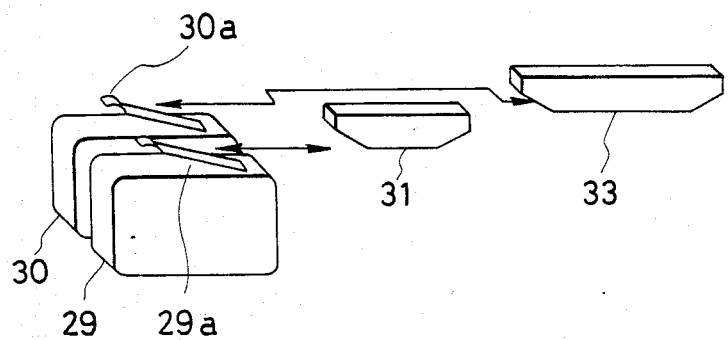
FIG. 4 shows a perspective view of an arrangement of microswitches and pushing pieces.

The timing control operation for bringing the foremost end of the paper into coincidence with the foremost end of the toner image will be briefly described by referring to FIGS. 3, 4, 5A and 5B (but FIG. 4 shows the copying section 2 viewed from the rear side thereof). A sensor 28 for detecting the foremost end of the paper is located right before the timing rollers 20 on the passage for conveying the papers, and microswitches 29 and 30 are arranged side by side on the case 2b of the copying section 2. The microswitches 29 and 30 are provided with actuators 29a and 30a respectively, and push pieces 31 and 32 are located under the glass plate 6, corresponding to the microswitch 29, while a push piece 33 is located corresponding to the microswitch 30. Therefore, the push pieces 31 and 32 are located at those positions where they can push the actuator 29a, while the push piece 33 at that position where it can push the actuator 30a.

Figure 5A:
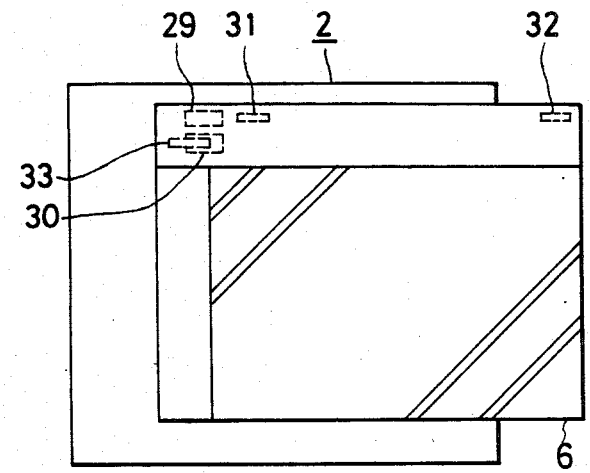
FIGS. 5A and 5B show views of positional arrangements of the microswitches and pushing pieces.
Figure 5B:
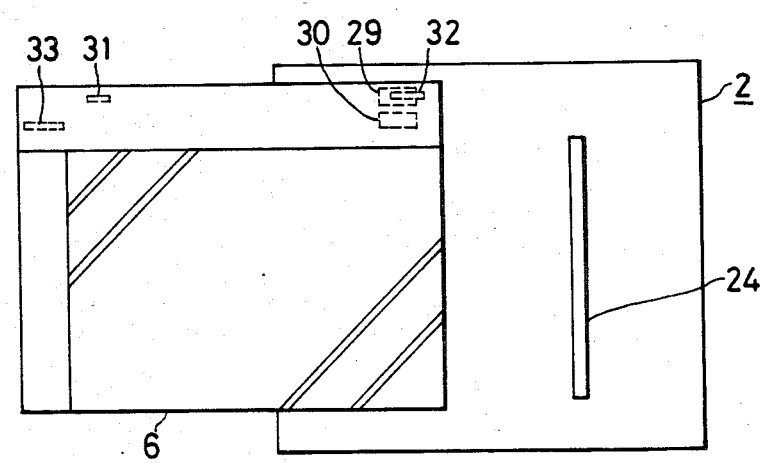

As shown in FIG. 5A, the push piece 33 is stopped, pushing down the actuator 30a at the time of starting the copy. When an original copying switch, which will be described later, is turned on, the paper is fed onto the conveying passage by means of the paper supply roller 19, and after the lapse of a certain time period since the foremost end of the paper is detected by the sensor 28, the paper is stopped, contacting with the timing rollers 20 at the foremost end thereof.

At the same time as the waiting sensor 28 is made operative, the light source 7 is turned on and the glass plate 6 starts its forward scanning in a direction shown by the arrow 34a. At the same time as the push piece 31 pushes down the actuator 29a during the forward movement of the glass plate 6, or after the lapse of a certain time period which is determined by the copying magnification, the timing rollers 20 start their rotation and the paper is thus fed to the transferring means 17, synchronizing with the toner image on the photosensitive face 12.

Transfer operation is carried out and the glass plate 6 continues to move forward till the rear end of the paper passes through the sensor 28. When the rear end of the paper passes through the waiting sensor 28, the glass plate 6 stops its forward scanning, retreats to a direction shown by the arrow 34b, and stops, keeping the actuator 30a pushed down by the push piece 33. In a case where a sheet of paper as large in size as possible for the copying section is used to carry out a reduced copying operation, the push piece 32, which is attached to the underside of the glass plate 6 to correspond to the position for limiting the forward scanning of the glass plate 6, pushes down the actuator 29a before the rear end of the paper passes through the waiting sensor 28, and the glass plate 6 stops, keeping the actuator 29a pushed down, till the back end of the paper passes through the sensor 28. The glass plate 6 thereafter retreats thereafter.

Figure 6:
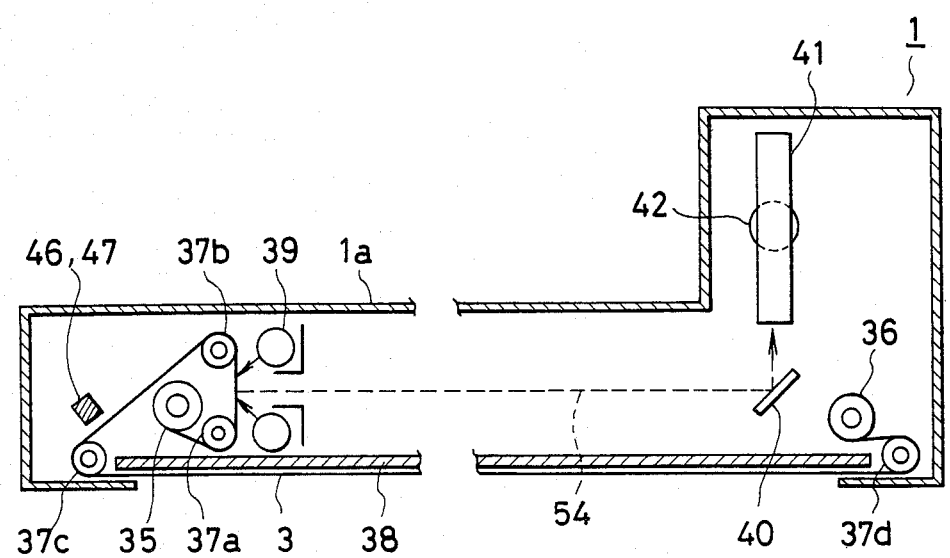
FIG. 6 shows a section view of an arrangement of the board section.

An arrangement of the board section 1 will be described with reference to FIG. 6. The means for winding the board sheet 3 includes winding rollers 35, 36, feeding rollers 37a–37d and the like. The board sheet 3 wound around the winding roller 36 is wound by the winding roller 35 through the feeding rollers 37a–37d and the winding operation is carried out through a drive mechanism (not shown) at a uniform speed. The board sheet 3 thus wound is re-wound by the winding roller 36. The board sheet 3, stretched between the rollers 35 and 36 is held by the feeding rollers 37a–37d, to form a face parallel to the frame 1a. The board sheet 3 is also maintained to have a plane by a backup board 38.

The board sheet 3 is a long sheet member on which writing can be done, using a felt pen and the like, and which makes it possible to wipe and erase images thereon. A part of the board sheet 3 is exposed through an opening formed in the outer casing for the board section 1.

The optical system for the board sheet 3 includes a first mirror 40, a second mirror 41, a lens 42 for the board sheet 3 and the like, and a fluorescent lamp 39 irradiates its light onto the plane portion of the board sheet 3 stretched between the feeding rollers 37a and 37b.

Figure 7:
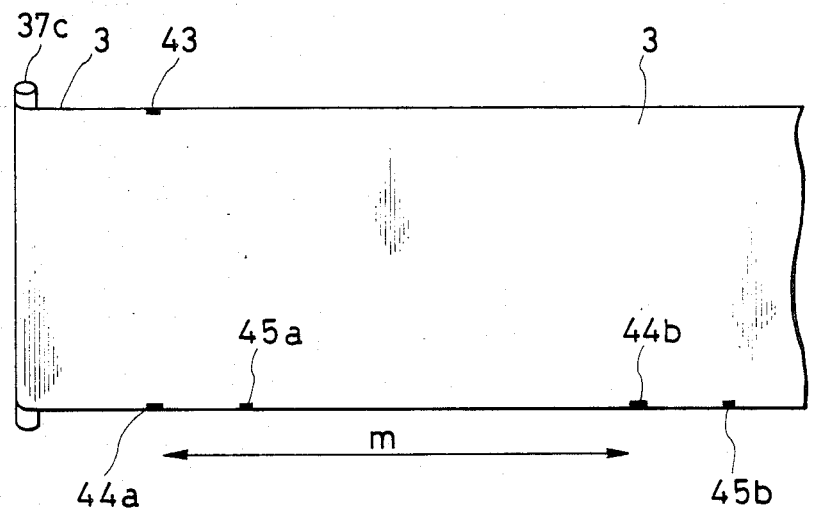
FIG. 7 shows a front view of an arrangement of the board sheet.

As shown in FIG. 7, the first page detecting mark 43, which is used to confirm the initial position of the board sheet 3 is arranged at a position on the upper side of the board sheet 3. Further, page detecting marks 44a, 44b, - - -, each of which is used to confirm the stop position of copying section 2 relative to the board section 1 will be described below.

Figure 10A:
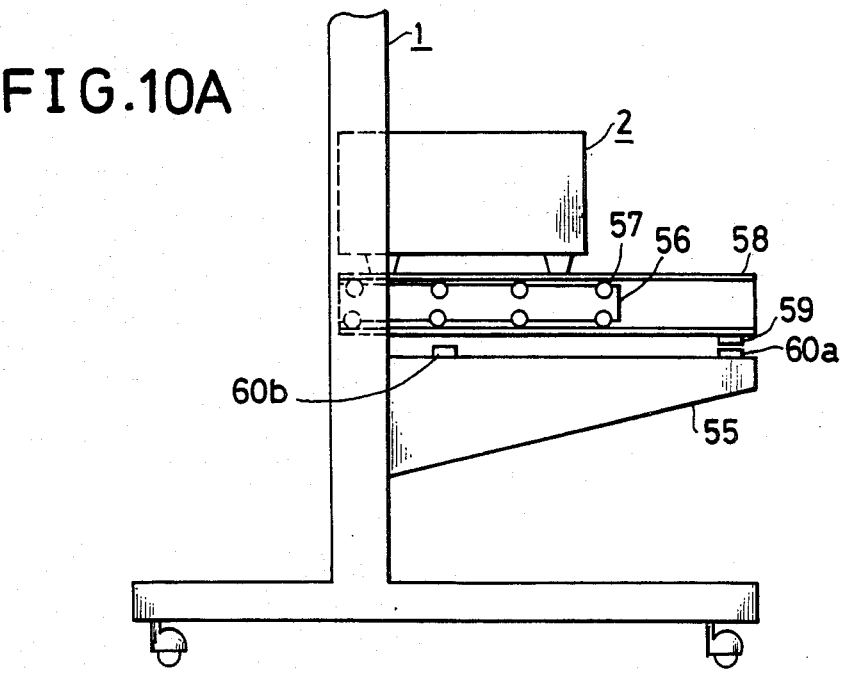
FIG. 10A, 10B and 10C show the transferring section moving.
Figure 10B:
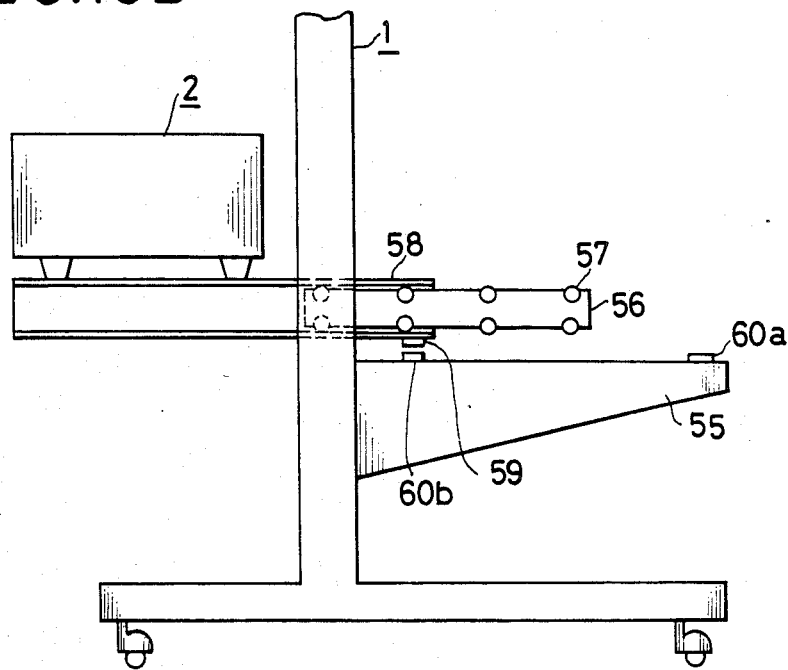
Figure 10C:
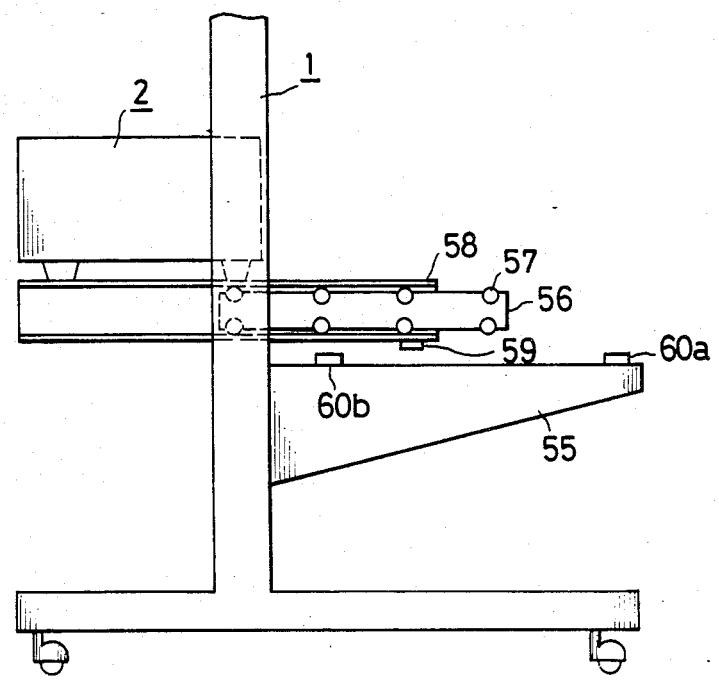

As described above, the copying section 2 is pulled out, as shown in FIG. 1, when images on the originals are to be copied, and it is pushed in, as shown in FIG. 2, when images on the board sheet 3 are to be reproduced. When an image on the board sheet 3 is to be copied, light is irradiated onto the image on the board sheet 3 in the frame 1a and the light 54 which is reflected enters into the copying section 2 through the exposure opening 24 which is formed at a predetermined position, as described above. FIGS. 10A through 10C show the image reproduction apparatus, which is embodied according to the present invention and which has the above-described arrangement, viewed from the right side thereof.

Figure 11:
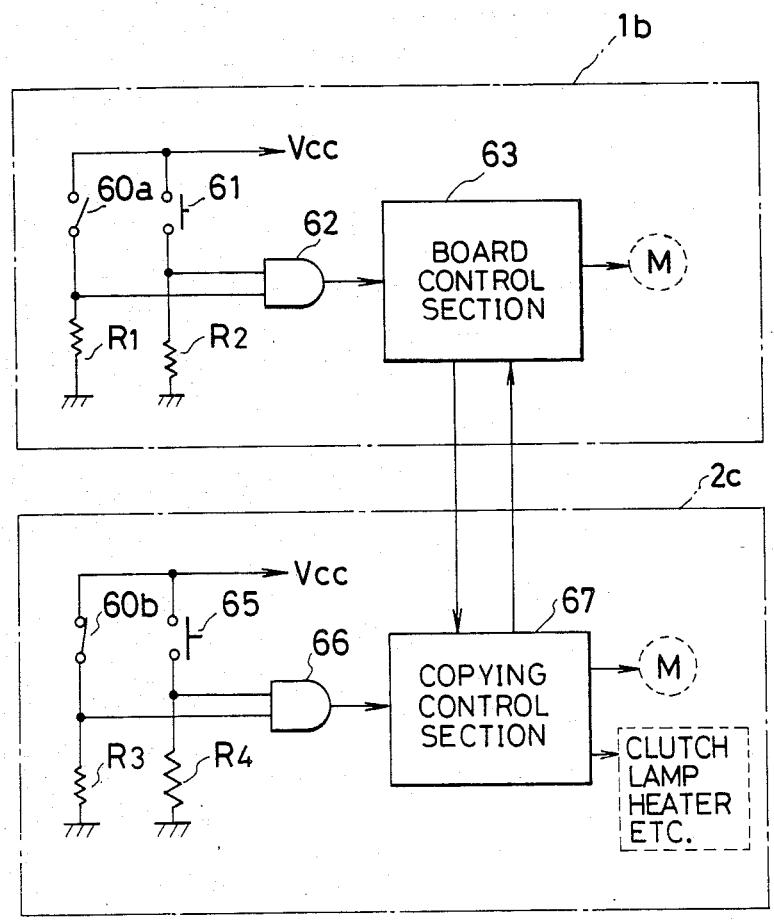
FIG. 11 shows a circuit diagram for controlling the image reproduction apparatus of the present invention.

FIG. 10A shows the copying section 2 completely pushed in and this is a condition shown in FIG. 2. FIG. 10B shows the copying section 2 completely pulled out and this is a condition shown in FIG. 1. FIG. 10C shows the copying section 2 remaining on the way of its movement, where the copying section 2 does not yet reach the front end or the back end. For the sake of clarity, the frame 1a is omitted in FIGS. 10A through 10C. In FIGS. 10A through 10C, a rail 56 is fixed to the board section 1 by a mechanism (not shown) and four freely-rotatable rollers 57 are arranged on the upper and lower sides of the fixed rail 56 respectively. Another rail 58 is attached, freely slidable, to the fixed rail 56 via the rollers 57. A magnet 59 is attached to the underside of the slidable rail 58 at the rear end portion thereof. Also attached onto the surface of a table 55 are two reed sensors, 60a and 60b, wherein the reed sensor 60a is located at a position where the magnet 59 on the underside of the slidable rail 58 is stopped when the copying section 2 reaches the position shown in FIG. 10A, and wherein the reed sensor 60b is located at a position where the magnet 59 is stopped when the copying section 2 reaches the position shown in FIG. 10B. Connected to these reed sensors 60a and 60b is a control circuit as shown in FIG. 11, which includes a control section 1b for the board section 1 and a control section 2c for the copying section 2. The reed sensor 60a is connected to the control section 1b and the reed sensor 60b to the control section 2c.

The control circuit for the board section 1 includes a board copying switch 61, the same as the above-mentioned switch 50, the reed sensor 60a, resistors R1 and R2, an AND gate 62, and a board control section 63, wherein one end of each of the board copying switch 61 and reed sensor 60a is connected to a power source (Vcc) while the other ends thereof are earthed through the resistors R1 and R2, respectively. Connecting points between the board copying switch 61 and the resistor R2, and between the reed sensor 60a and the resistor R1 are connected to the AND gate 62 and the output of the AND gate 62 is inputted to the board control section 63. A control signal is applied from the output of the board control section 63 to a motor for driving the board sheet winding roller.

On the other hand, the circuit for the copying section 2 includes an original copying switch 65, the above-mentioned reed sensor 60b, resistors R3, R4, an AND gate 66 and a copying control section 67, wherein one end of each of the original copying switch 65 and reed sensor 60b is connected to a power source (Vcc) and the other ends thereof are earthed through the resistors R3 and R4 respectively. Connecting points between the original copying switch 65 and the resistor R4 and between the reed sensor 60b and the resistor R3 are connected to the AND gate 66, whose output is inputted to the copying control section 67.

A control signal is applied to a motor for driving the photosensitive drum 11 and the like; clutches, lamp heaters and the like through the output of the control section 67.

In a case where images on the board sheet 3 or originals above the copying section 2 are to be reproduced using the detector mechanism employed by this example of the image reproduction apparatus to detect the position of the copying section 2, the copying section 2 is moved forward and backward as will be described later.

In the case where images on the originals are to be reproduced, for example, the copying section 2 is pulled out forward, as shown in FIGS. 1 and 10B, and the original copying switch 65 is turned on. If the reed sensor 60b is not put on at the same time, the signal for driving the copying section 2 is not outputted from the AND gate 66 through the copying control section 67, thereby making the copying section 2 unable to start its copying operation.

More specifically, it is necessary that the reed sensor 60b is turned on at the time when the original copying switch 65 is put on. In the case where the magnet 59 is at the position where it turns on the reed sensor 60b completely, as shown in FIGS. 1 and 10B, that is, in the case where the copying section 2 is completely pulled out forward, therefore, the copying section 2 can carry out its original copying opertion, but in the case where the copying section 2 is not completely pulled out forward, as shown in FIG. 10C, the magnet 59 does not render the reed sensor 60b operative, so that the copying section 2 cannot perform its copying operation.

Similarly, in the case where images on the board sheet 3 are to be reproduced, the magnet 59 makes the reed sensor 60a operative when the copying section 2 is completely pushed in backward, as shown in FIGS. 2 and 10A, and if the copying switch 61 is switched on, the images on the board sheet 3 can be reproduced by the copying section 2. In the case where the copying section 2 is not completely pushed in backward, however, the magnet 59 cannot make the reed sensor 60a operative and even if the board copying switch 61 is switched on, no output is applied from the AND gate 62. Therefore, the board winding motor and the like are not driven through the board control section 63 and the operation of reproducing the images on the board sheet 3 cannot be carried out.

According to the above-described detector mechanism for detecting the position of the copying section 2, the original reproducing operation can be achieved when it is detected by the magnet 59 and reed sensor 60b, whether or not the copying section 2 is completely pulled out forward, and the images on the board sheet 3 can be reproduced when it is detected by the magnet 59 and reed sensor 60a, whether or not the copying section 2 is completely pushed in backward. If the copying operation should be achieved when the copying section 2 is at the position shown in FIG. 10C, the glass plate 6 would be broken, striking against the board section 1, or the images on the board sheet 3 would not be accurately reproduced because the light in which information of the images on the board sheet 3 are contained cannot enter the predetermined position in the copying section a page, and timing marks 45a, 45b, - - -, each of which is synchronized with the copying section at the time of copying each of the pages, are arranged at every certain interval (m) on the lower side of the board sheet 3. In the case of this embodiment, the page detecting marks include 44e (not shown) and the board sheet 3 which are divided to correspond to five pages. Mark sensors 46 and 47 are arranged at positions which correspond to the first page detecting mark 43, page detecting marks 44a–44e, and timing marks 45a–45e.

Figure 8:
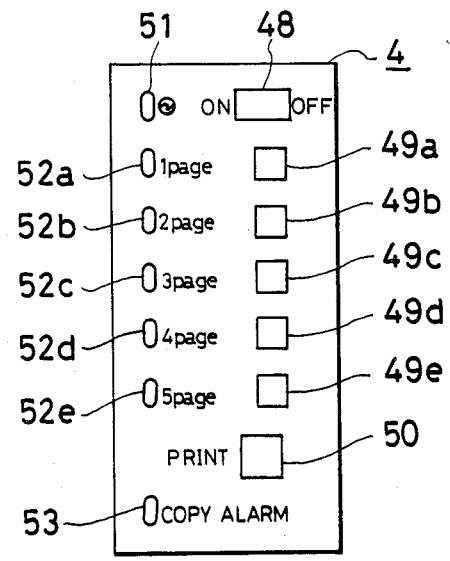
FIG. 8 shows a front view of an arrangement of the operating section.

The board operating section 4 includes a power source switch 48, switches 49a–49e for indicating their respective pages, a board copying switch 50, a power source lamp 51, turned on when the power source switch 48 is put on, page display lamps 52a–52e, turned on when the page indicating switches 49a–49e are put on, and an alarm lamp 53, as shown in FIG. 8.

The alarm lamp 53 is turned on when it is detected by a mechanism for detecting the position of the copying section 2 which will be described later, that the copying section 2 is not located at the position where the image on the board sheet 3 is reproduced, and it flickers when no paper exists and when the fixing means 21 does not reach a predetermined temperature.

If the mark sensor 46 does not detect the first page detecting mark 43 when the power source switch 48 is switched on, the winding roller is driven to move the board sheet 3 to the position where the mark sensor 46 detects the first page detecting mark 43.

The process of reproducing images such as letters and figures on the board sheet 3 in the image reproduction apparatus which has the above-described arrangement and which is an essential matter of the present invention, will be described below.

Figure 9:
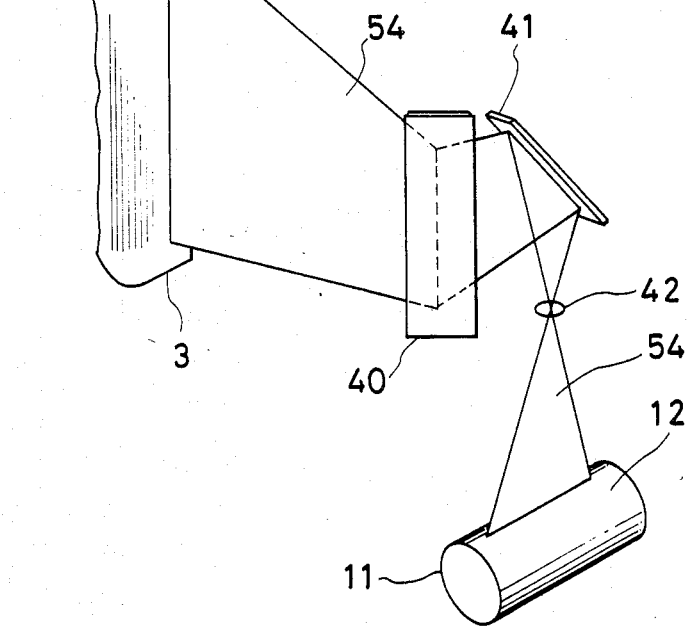
FIG. 9 shows a perspective view of the passage of light reflected.

FIG. 9 shows the passage of light 54 reflected from the board sheet 3 when the light of the fluorescent lamp 39 is irradiated onto the board sheet 3 which passes between the feeding rollers 37a and 37b, and on which, letters, figures and the like have been written.

As shown in FIG. 9, the reflected light 54 is reflected by 90° by the first mirror 40 which is inclined by 45° relative to the reflected light 54, and it is further reflected downward by 90° by the second mirror 41. It then exposes the photosensitive drum 11 in the copying section 2 through the lens 42. The shutter 26 and the like under the glass plate 6, which is located on the passage of the reflected light 54, are moved outside the passage of the reflected light 54 when it is detected by a mechanism for detecting the position of the copying section 2 which will be described later; that the copying section 2 is located at the position where the image on the board sheet 3 can be reproduced, that is, the shutter 26 is swung to a position shown by a broken line in FIG. 3. Further, the glass plate 6 and original cover 6b are moved to a position where they do not close the exposure opening 24 (the state shown in FIG. 5B). Therefore, the reflected light 54, passed through the lens 42, further passes through the exposure opening 24 in the casing 2b and irradiates the photosensitive face 12 of the photosensitive drum 11. The copying lens 9a can also be moved to a position 9b shown by a broken line when it is located at a position shown by a solid line, to close the passage of the reflected light 54.

It may be arranged that the movement of each of these parts is carried out at the same time as the board copying switch 50 is pushed down and that a substantial copying operation is conducted after the movement of each of the parts is finished.

After the photosensitive face 12 is exposed by the reflected light 54, developing, transferring, cleaning and the other processes which are the same in the case of copying the original are conducted, thereby enabling the image on the board sheet 3 to be reproduced onto the paper. The timing between the image on the board sheet 3 and the paper is established, using the first page detecting mark 43, page detecting marks 44a–44e, timing marks 45a–45e, and mark sensors 46, 47. In a case where the copying section 2 is already located at the position where it can copy the image on the board sheet 3, and where the image on the third page of the board sheet 3 is to be copied, for example, the page indicating switch 49c is switched on to turn on the page display lamp 52c which displays the third page of the board sheet 3 to be copied, while the winding roller 35 is driven by a board control section 6 shown in FIG. 11, detecting and counting the page detecting marks on the moving board sheet 3, and it is stopped when the page detecting mark 44c, which corresponds to the third page of the board sheet 3, is detected. When the printing switch 50 is pushed down after the page display lamp 52c is turned on, the paper supply roller 19 starts its rotation (at the same time as the page detecting mark 44c is detected if the winding roller 35 is being driven, or at the same time as the board copying switch 50 is turned on if the winding roller is stopped) to thereby feed the paper from the paper supply cassette 18 onto the conveying passage. After the foremost end of the paper which has been fed onto the conveying passage passes through the sensor 28, the paper supply roller 19 is rotated for a predetermined time period and the paper is stopped from contacting with the timing rollers 20 at the foremost end thereof. At the same time as the sensor 28 detects the foremost end of the paper, a signal which indicates the board sheet 3 to be wound is applied to the board section 1 through a control circuit, which will be described later, to thereby drive the winding roller 35. The board sheet 3 thus starts its movement and the image on the board sheet 3 is formed on the photosensitive face 12, as already described above. When the timing mark 45c on the board sheet 3 is detected by the mark sensor 47, a timing signal is applied from the board section 1 to the copying section 2 and the timing rollers 20 thus start their rotation to feed the paper to the transferring means 17. This movement enables the foremost end of the paper to be brought into coincidence with the foremost end of the toner image on the photosensitive face 12, so that the toner image can be transferred to its right position on the paper. When the next page detecting mark 44d is detected by the mark sensor 47, the drive of the winding roller is stopped.

In a case where the first, second and fourth pages of the board sheet 3 are to be copied, the same operation can be carried out.

According to the embodiment described above, the images on the board sheet 3 can be copied by the usual copying machine, wherein the exposure opening 24 is provided at a part of the copying machine casing 2b and the glass plate 6; original cover 6b and the optical system including the copying lens 9a and the like in the copying section 2 are moved.

As described above referring to FIGS. 1 and 2, the above-described image reproducing operation cannot be achieved when the copying section 2 is not moved to the right position where the image on the original or on the board sheet 3 is to be copied. Therefore, a detector mechanism for detecting the right stop position of the 2. These problems can be solved by the above-mentioned detector mechanism.

A measure for preventing light from outside, which is different from the reflected light 54, from entering the copying section 2 through that portion where the copying section 2 is engaged with the board section 1 will be described below.

Figure 12:
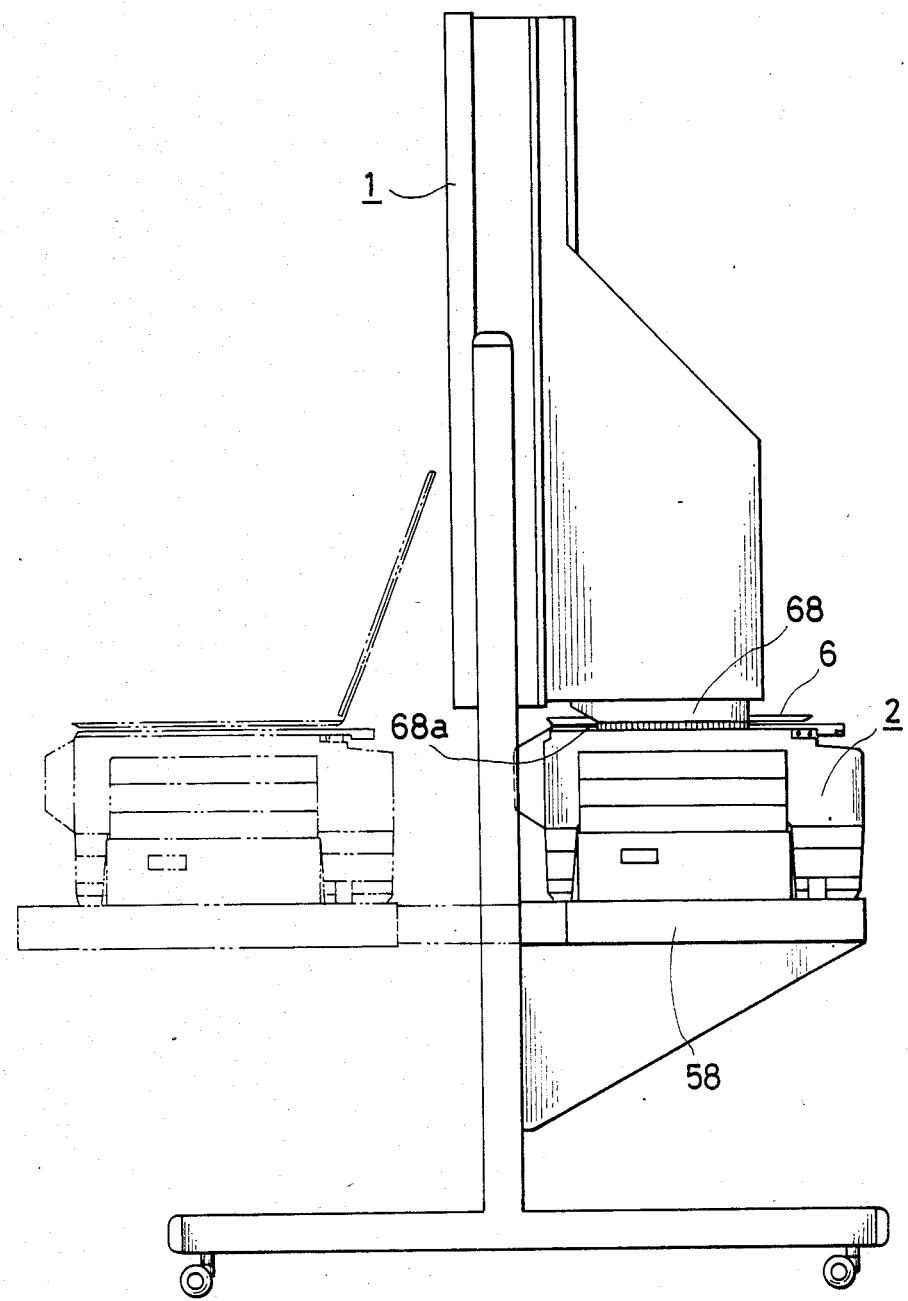
FIG. 12 is a side view showing the image reproduction apparatus of the present invention.

FIG. 12 shows the image reproduction apparatus viewed from the right side thereof, but the arrangement of the copying and board sections 2 and 1 is shown in more detail in FIG. 12 than in FIGS. 10A through 10C, for the purpose of explaining the mechanism for preventing light outside from entering into the copying section 2 through that portion where the copying section 2 is engaged with the board section 1. The solid line in FIG. 12 shows that the copying section 2 is in the state of reproducing the images on the board sheet 3, while the two-dot-and-dash line shows that the copying section 2 is in the state of copying the images on the originals. A light shielding member 68 is attached freely rotatable to the board section 1 by means of a shaft which will be described later. A brush 68a is attached to the underside of the light shielding member 68, which is located right above the exposure opening 24 of the copying section 2 when the board section 1 is engaged with the copying section 2.

Figure 13:
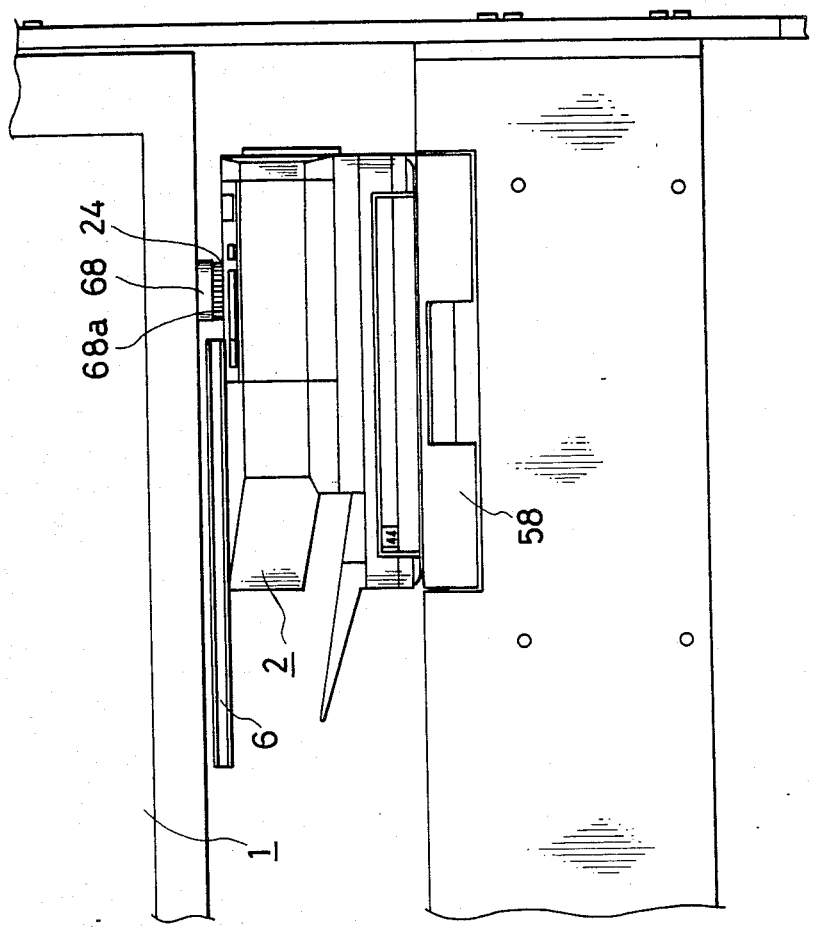
FIG. 13 is a front view showing part of the image reproduction apparatus of the present invention.

FIG. 13 shows a part of the image reproduction apparatus viewed from the front side thereof. Since a piece of brush 68a is attached to the circumferential edge of the underside of the box-like light shielding member 68, as shown in FIG. 13, the light shielding member 68 softly contacts the upper surface of the copying section 2. Therefore, the light shielding member 68 is kept softly contacted with the copying section 2 from the state in which the copying section 2 is pulled out forward to reproduce the images on the originals (as shown in FIG. 1) to the state in which the copying section 2 is pushed in backward along the rail 5a to finally contact the board section 1 (as shown in FIG. 2).

When the copying section 2, which has been pulled out forward, is contacted with the board section 1, the glass plate 6 is automatically retreated to and stopped at the position where it opens the exposure opening 24. The shutter 26 located right under the exposure opening 24 is opened by a solenoid (not shown) at the same time as the board copying switch 50 is switched on.

Figure 14:
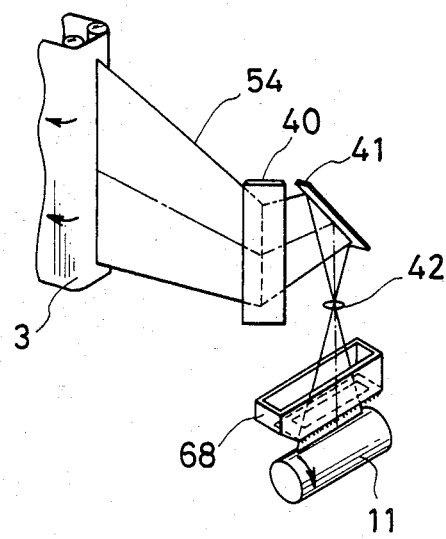
FIG. 14 shows an arrangement of the optical system in the board section.
Figure 15A:
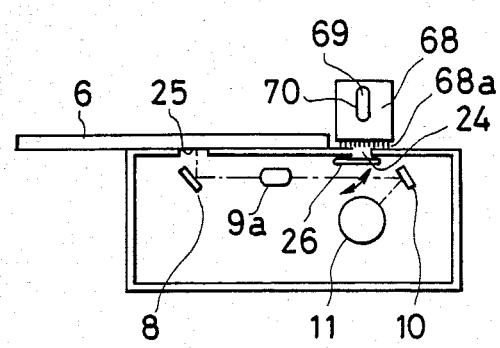
FIG. 15A and 15B show a section view of a light shielding member being operated.
Figure 15B:
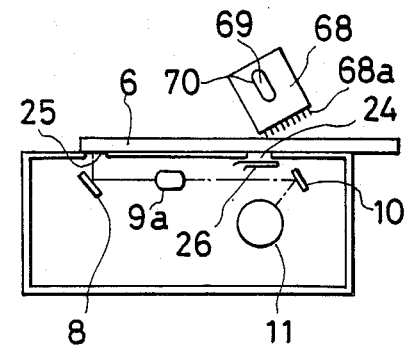

When the light shielding member 68, supported by the board section 1 is arranged between the board section 1 and the copying section 2, as described above, the reflected light 54 shown in FIG. 9 exposes the photosensitive drum 11, passing through the board lens 42 and light shielding member 68, as shown in FIG. 14. FIGS. 15A and 15B are intended to explain the operation of the light shielding member 68 in the case where the light shielding member 68 is arranged as described above and where the copying section 2 is moved.

In a case where the glass plate 6 is at its normal position (FIG. 15A) and not housed in the board section 1 at the time when the copying section 2 is engaged with the board section 1, the glass plate 6 is at once moved to the state (home position) shown in FIG. 15B and then moved to and topped at the position (board copying position) shown in FIG. 15A, thereby retreating the glass plate 6 from above the exposure opening 24.

It is disadvantageous, however, that the glass plate 6 strikes against the light shielding member 68 this time. This disadvantage can be avoided if the length of the brush fibers is made long, but the light shielding effect becomes incomplete and the cost of the brush with such long fibers is high. According to the present invention, therefore, the light shielding member 68 is lifted upward while swung in anti-clockwise direction by means of a shaft 69 and a slit 70 when the glass plate 6 strikes against the light shielding member 68, thereby enabling the light shielding member 68 to be swung corresponding to the movement of the glass plate 6.

Figure 16A:
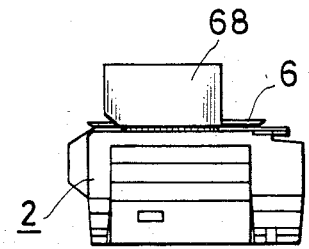
FIGS. 16A, 16B and 16C show a side view of the light shielding member engaged with, released from, and on the way to its being engaged with the copying section.
Figure 16B:
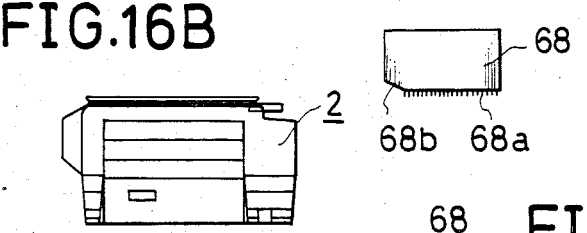
Figure 16C:
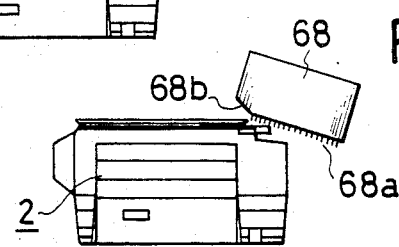

FIGS. 16A, 16B and 16C show the relation between the copying section 2, which is pulled out and pushed in, and the light shielding member 68. The copying section 2 is in the state shown in FIG. 16A when it is engaged with the board section 1, but when it is pulled out forward to copy the images on the originals, it moves into the state shown in FIG. 16B; that is, it is separated from the light shielding member 68. The shutter 26 in it is closed this time. When the copying section 2 is again engaged with the board section 1, it may be broken, striking against the light shielding member 68 if no measure is prepared. According to the present invention, therefore, the light shielding member 68 is provided with a pivot portion which consists of the shaft 69 and slit 70, and it is lifted upward through this pivot portion when the glass plate 6 contacts it. In addition, the light shielding member 68 is provided with a slope 68b, by which it is guided upward, so that it can move responding to the movement of the copying section 2.

According to this example of the image reproduction apparatus as described above, the light, including image information can be accurately irradiated onto the photosensitive face 12 through that portion where the copying section 2 is engaged with the board section 1, and light outside, which has no relation to the image information can be reliably prevented from entering into the copying section 2 through that engaged portion between the copying section 2 and the board section 1, even when the images on the board sheet 3 are to be reproduced.

A support 5 on which the copying section 2 is mounted, and which carries the copying section 2 from the position at which the images on the board sheet 3 are reproduced to the position at which the images on the originals are copied will be described below.

Figure 17:
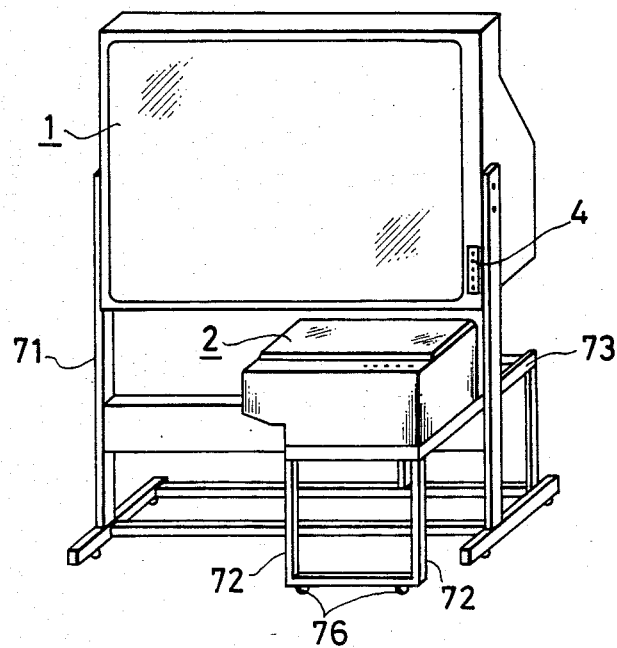
Figure 18:
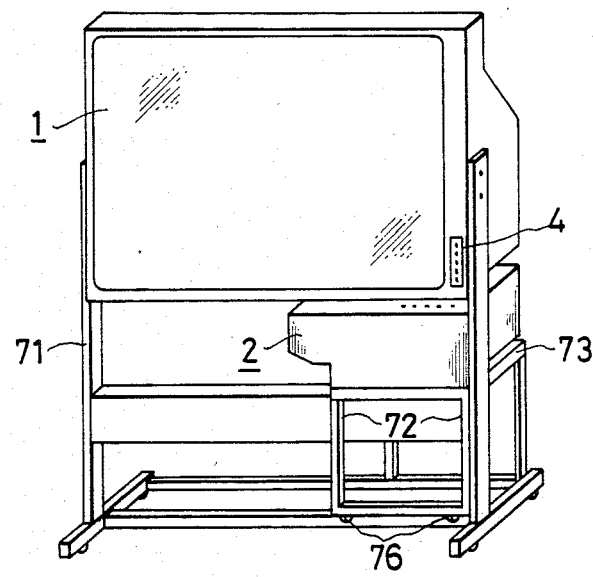

FIGS. 17 and 18 are perspective views showing another example of the image reproduction apparatus. FIG. 17 shows the copying section 2 pulled out of a support frame 71 to the original copying position, and the numeral 72 represents an auxiliary leg-like member for supporting the foremost end portion of the copying section 2 on the floor. On the other hand, FIG. 18 shows the copying section 2 pushed in the support frame 71 to locate at the board sheet copying position.

Figure 19:
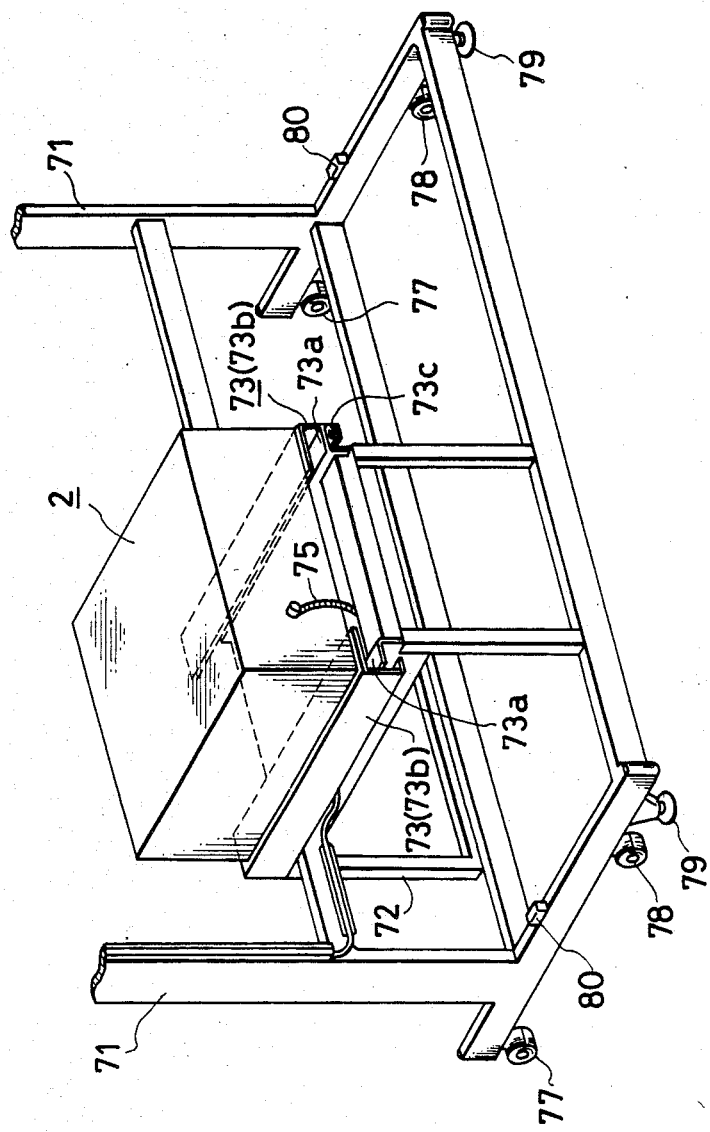
Figure 20:
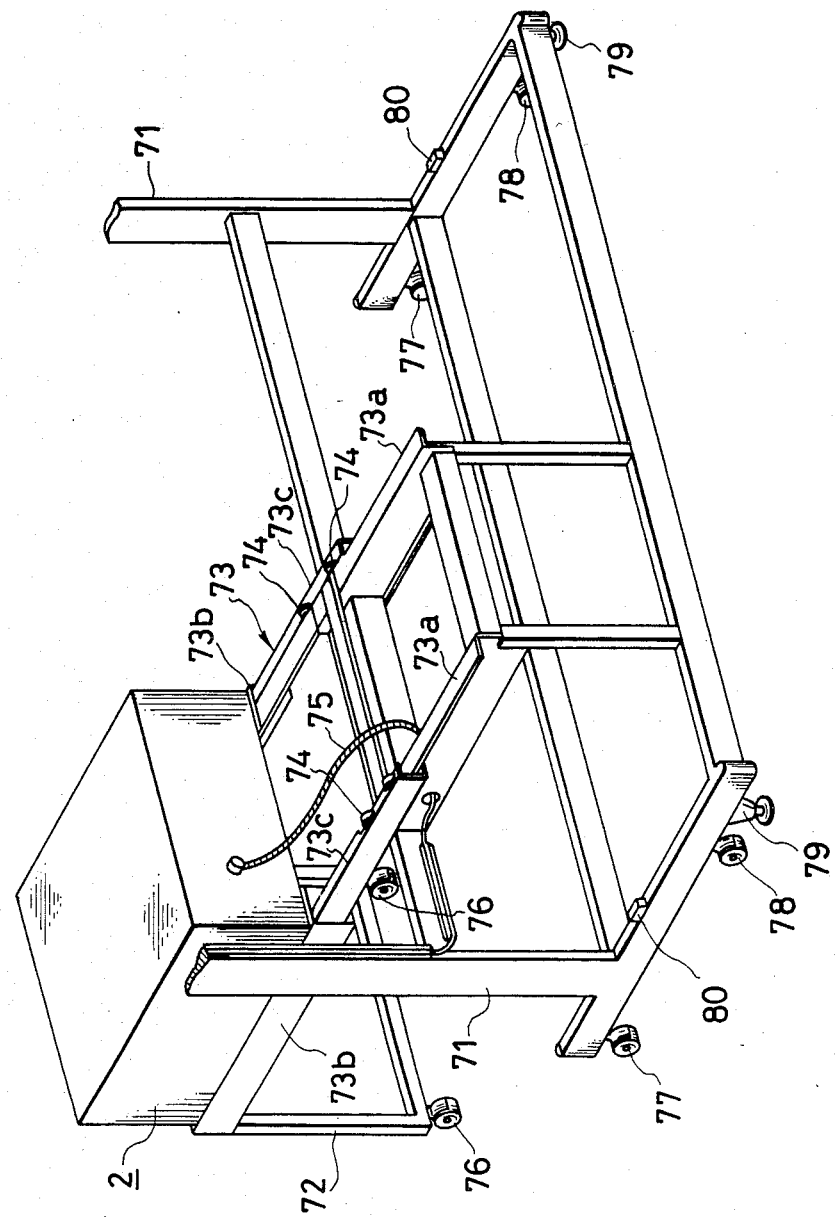
Figure 21:
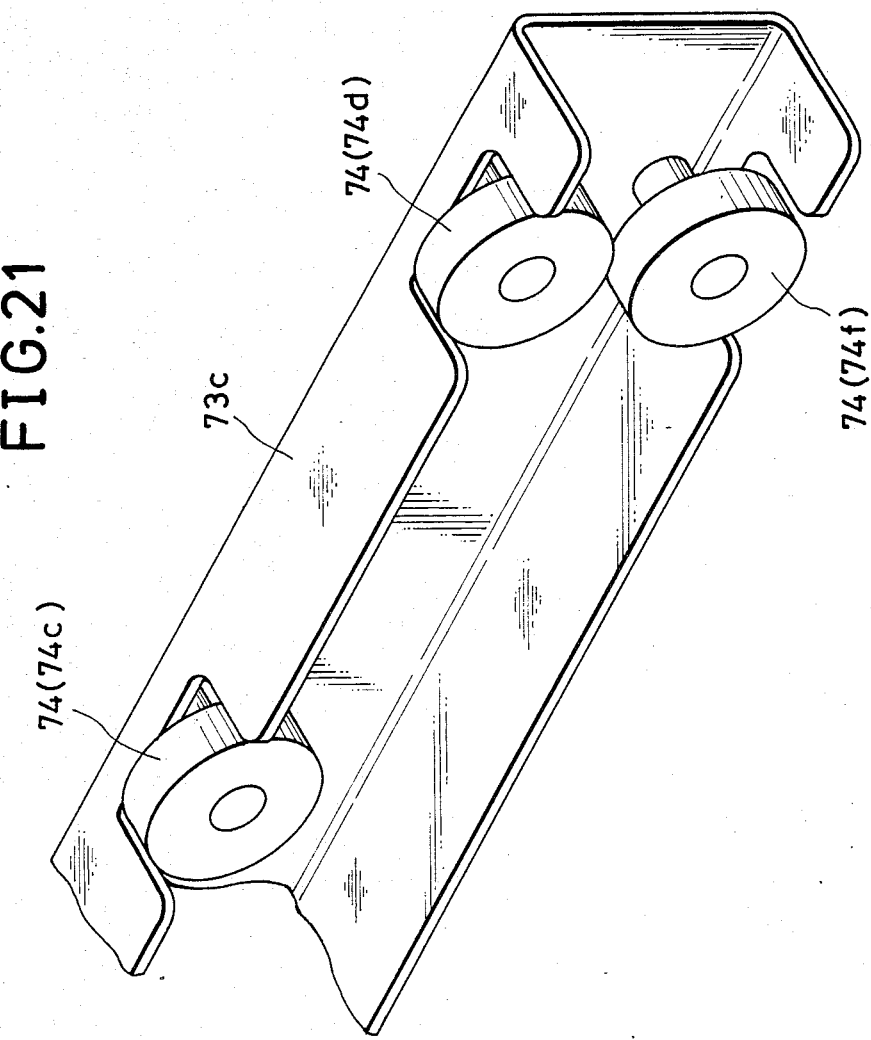

FIGS. 19 and 20 show the auxiliary member 72 and a slider mechanism for the copying section 2 in more detail. The copying section 2 is simplified in FIGS. 19 and 20.

In FIGS. 19, the copying section 2 is at the position where it reproduces the images on the board sheet 3, where it is pushed in the support frame 71.

The movement of the copying section 2 relative to the support frame 71 is carried out along a guide rail 73, which includes rails 73a fixed to the support frame 71, moving rails 73b on which the copying section 2 is mounted, and intermediate rails 73c interposed between the fixed and the moving rails 73a and 73b and provided with a roller means 74.

As shown in FIGS. 21 through 24, for example, the roller means 74 includes an appropriate number of rollers, some of which are located on the fixed rail 73a as guide rollers 74a, 74b, 74c and 74d, and the others of which are located under the fixed rail 73a as floatation preventing rollers 74e and 74f.

In FIG. 20, the copying section 2 is pulled forward out of the support frame 71 to locate at the original copying position. When the copying section 2 is manually pulled out like this, the rails 73b are moved on the fixed rails 73a, with the intermediate rails 73c interposed between them accordingly. The extent to which the copying section 2 is pulled out is defined by a stopper. In addition, the copying section 2 is reliably stopped at the original copying position by means of the position detector mechanism, similarly to the case of the above-described first embodiment. Numeral 75 represents a cable through which power source and other electrical lines are connected to the copying section 2.

As described above, the auxiliary leg-like member 72 is attached to the underside of the front end portion of the moving rails 73b and a caster 76 which contacts the floor is attached to the auxiliary member 72. The caster 76 is adapted to contact the floor in the course of pulling out the copying section 2 to a predetermined position (or original copying position). This is shown in FIGS. 22 through 24.

Figure 22:
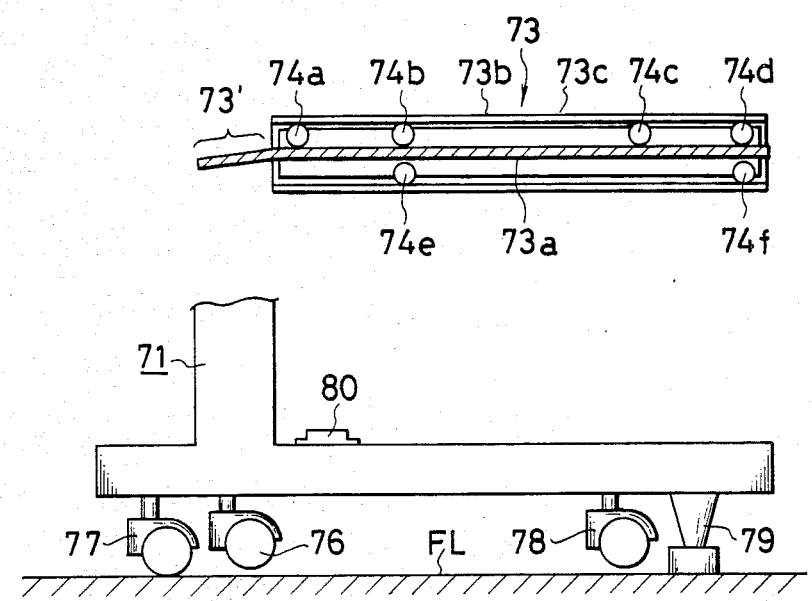
Figure 23:
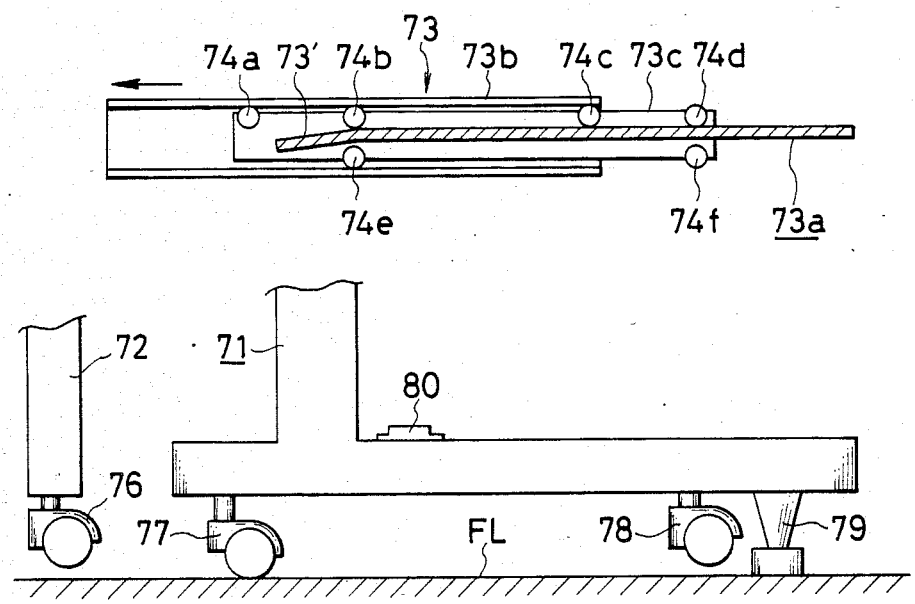

The fixed rail 73a is provided with a slope 73' at the front end thereof, and when the copying section 2 is pushed in backward to locate at the board sheet reproducing position, the rollers 74a-74d are contacted with the upper plane surface of the fixed rail 73a, as shown in FIG. 22. In this state, the caster 76 attached to the auxiliary member 72 floats above the floor FL.

Another caster 77 is intended to support the support frame 71, and a further caster 78 is used when the support frame 71 or the whole of the image reproduction apparatus is moved. This caster 78 is usually floated above the floor by an adjuster 79 contacted with the floor, and the support frame 71 is supported by the adjuster 79. This adjuster 79 is used to adjust the horizontal state of the support frame 71 when the whole of the image reproduction apparatus is carried or moved to a new position. Numeral 80 denotes a level attached to the support frame 71.

When the copying section 2 is at the position of its reproducing the images on the board sheet 3, the positional accuracy of the optical system in the course of reproducing the images on board section 1 with the copying section 2 is not influenced by the unevenness of the floor FL and the image reproduction can be thus made stable, because the caste 76 is kept float above the floor.

The operation shown in FIG. 23 will be described. This is a course in which the copying section 2 is pulled out of the support frame 71 to reach the original copying position.

In the course during which the copying section 2 is moved from the board sheet copying position shown in FIG. 22 to the original copying position shown in FIG. 24, the guide rollers 74a-74d which are contacted with the plane surface of the fixed rail 73a are rotated by frictional force, following the movement of the moving rail 73b which is moved by pulling out the copying section 2, and the intermediate rail 73c is moved in a direction same as the moving direction of the rail 73b, following the rotating movement of the guide rollers 74a-74d (see FIG. 23). When the guide roller 74b on the front side reaches the slope 73' of the fixed rail 73a as the result of its moving together with the intermediate rail 73c, the roller 74b of the intermediate rail 73c is lowered by the load on the moving rail 73b, thereby causing the caster 76, which has been moved float above the floor, to be contacted with the floor FL.

After the caster 76 is thus contacted with the floor FL, the load of the moving rails 73b and of the copying section 2 mounted thereon are supported by the caster 76 and subsequent roller 74c. The roller 74f serves to prevent the rear end portion of the intermediate rail 73c from being lifted by the load of the copying section 2 pulled out, but since almost all of the load of the copying section 2 is accepted by the auxiliary member 72 and caster 76, no larger moment is applied to the intermediate rails 73c.

When the copying section 2 is thus pulled out to the original copying position, the cover 6b for covering the originals on the copying section 2 can be freely opened and closed and the copying section 2 can be used as the usual original copying machine.

Although the leg-like auxiliary member 72 for supporting the pulled-out copying section 2 has been located under the copying section 2 and extended toward the floor FL in the case of the above-described embodiment, it may be made extensible or collapsible.

According to the present invention, as described above in detail, it is unnecessary to house the board itself in the copying apparatus at the time of reproducing images on the board, so that an image reproducting apparatus, simplified and small-sized, can be provided at low cost. The same apparatus can be used to reproduce images on the board sheet as well as those on the originals.

In addition, no original copying operation is carried out in the case of the image reproduction apparatus when the copying section 2 is not completely pulled out forward. Therefore, mechanical troubles such as the broken glass plate, which is caused when the glass plate 6 strikes against the board section 1 can be prevented.

Further, the process of reproducing images on the board sheet 3 is not carried out when the board section 1 is not engaged with the copying section 2, thereby enabling normal images to be obtained.

Furthermore, light outside is prevented by the light shielding member 68 from entering into the exposure opening 24 and passage of the reflected light 54, when the board section 1 is engaged with the copying section 2 to reproduce images on the board sheet 3, thereby enabling excellent images to be obtained at the time of reproducing the images on the board sheet 3.

Further still, the copying section 2 is mounted on the support frame 71 which serves to support the board section 1, and it is pulled out of the support frame 71, shifting from the board sheet reproducing position to the original copying position. Therefore, the load of the copying section 2 which has been pulled out to the original copying position can be dispersed onto the floor FL through the support frame 71 and auxiliary member 72, thereby enabling the board section 1 and pulled-out copying section 2 to be stably supported.

What is claimed is:

1. In the image reproduction apparatus including a display section where a display member provided with a display surface on and from which images can be written and erased is arranged movable, and a copying section detachable from the display section and capable of selectively copying images on the display surface and those on originals on a table on which the originals are mounted, said image reproduction apparatus characterized in that said copying section has a means for moving between a first position where said copying section is engaged with the display section and a second position where it is released from the display section, and that the image written on the display surface is copied at the first position while the original is copied at the second position.

2. In the image reproduction apparatus including a display section where a display member provided with a display surface on and from which images can be written and erased is arranged movable, and a copying section detachable from the display section and capable of selectively copying images on the display surface and those on originals on a table on which the originals are mounted, said image forming device characterized in that said display section has a drive means for causing the display member to be moved, a light source for exposing the display surface, and a first optical system for introducing light reflected from the display surface to the copying section, and that said copying section is movable between the first position where said copying section is engaged with the display section and the second position where it is released from the display section and has a second optical system introducing light, which is formed when the light of the light source located in the copying section is reflected by the original, to an image carrier.

3. A image reproduction apparatus according to claim 1 wherein said display member is a belt-like sheet member provided with a plurality of display faces.

4. An image reproduction apparatus according to claim 3 wherein said display member is provided with indication means each indicating each of the display faces.

5. An image reproduction apparatus according to claim 4 wherein said indication means are marks.

6. An image reproduction apparatus according to claim 1 wherein the moving direction of said display surface which is under display is the same as the scanning direction performed at the original copying time in the copying section.

7. An image reproduction apparatus according to claim 1 wherein said copying section is provided with an exposure opening through which the light reflected from the display surface is introduced, and a shutter means for opening and closing the exposure opening.

8. An image reproduction apparatus according to claim 1 wherein a first detector means is adapted to detect that said copying section is located at the first position.

9. An image reproduction apparatus according to claim 1 wherein a second detector means is adapted to detect that said copying section is located at the second position.

10. An image reproduction apparatus according to claim 8 wherein said display and copying sections can start their copying operation responsive to an output signal applied from the first detector means.

11. An image reproduction apparatus according to claim 9 wherein said copying section can start its copying operation responsive to an output signal applied from the second detector means.

12. An image reproduction apparatus according to claim 7 wherein the table on which the originals are mounted moves to a position where said shutter means is not shielded with the table when said copying section is at the first position.

13. An image reproduction apparatus according to claim 1 wherein said copying section has a support for enabling said copying section to move between the first and the second position, and wherein said copying section is supported by a display section bearing member in a case where said copying section is at the first position, while it is supported at least by its support in a case where it is at the second position.

14. An image reproduction apparatus according to claim 2 wherein said second optical system moves to a position of its not interfering the light passage which is formed by the first optical system, when said copying section is at the first position.

15. An image reproduction apparatus according to claim 2 wherein a shielding means is present between said display section and said copying section to shield light from outside, when said copying section is at the first position.

* * * * *

UNITED STATES PATENT AND TRADEMARK OFFICE
CERTIFICATE OF CORRECTION

PATENT NO. : 4,648,706

DATED : March 10, 1987

INVENTOR(S) : Sohei SHIBASAKI et al.

It is certified that error appears in the above-identified patent and that said Letters Patent is hereby corrected as shown below:

```
At column 1, line 21 delete "at".
At column 1, line 22 change "the" to ---during---, and
change "however, some" to ---an---.
At column 1, line 23 change "have" to ---has---.
At column 3, line 7 change "arrnge" to ---arrange---.
At column 3, line 67 insert ---is --- after "33".
At column 4, line 37 delete "thereafter" between "6"
and "retreats".
At column 9, line 27 change "fIG. 13" to ---FIG. 13 ---.
At column 13, line 28 (i.e., in claim 3, line 1)
change "A" to ---An---.
```

Signed and Sealed this

Twenty-third Day of August, 1988

*Attest:*

DONALD J. QUIGG

*Attesting Officer*   Commissioner of Patents and Trademarks